March 6, 1934.  N. PERSSON  1,950,152
REFRIGERATION
Filed Nov. 11, 1930
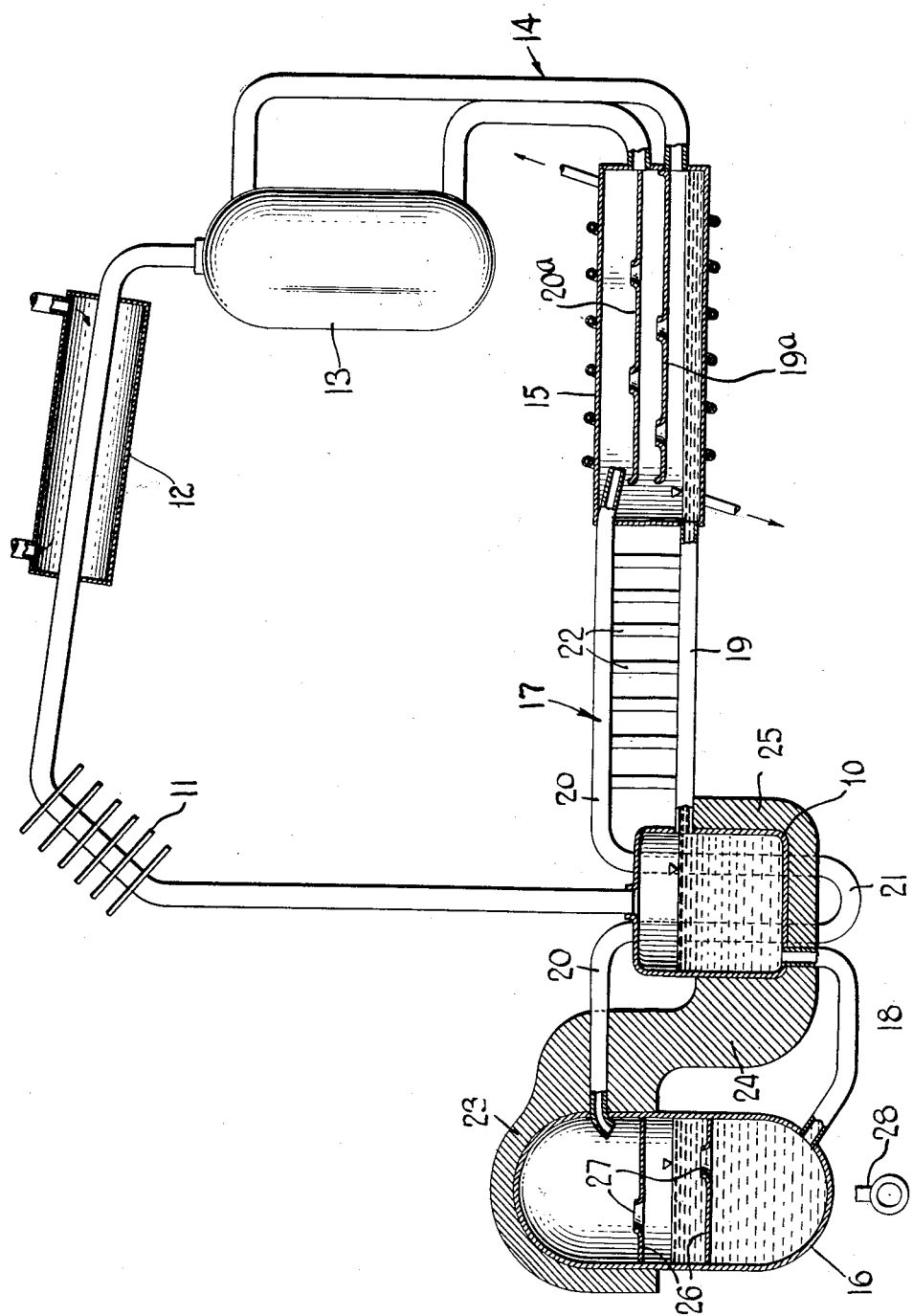
Inventor;
Nils Persson
By H. Yates Dowell
Atty.

Patented Mar. 6, 1934

1,950,152

UNITED STATES PATENT OFFICE 1,950,152

REFRIGERATION

Nils Persson, Stockholm, Sweden, assignor, by mesne assignments, to Electrolux Servel Corporation, New York, N. Y., a corporation of Delaware Application November 11, 1930, Serial No. 494,865
In Germany January 25, 1930

9 Claims. (Cl. 62—119.5)

This invention relates to a method of and means for producing circulation of the absorption liquid in an absorption refrigerating unit of the Platen-Munters type wherein a source of heat is employed for causing the operation of the refrigerating apparatus.

Among the objects of the invention are, to increase the efficiency of the unit by improving the circulation, to reduce the amount of energy wasted in the production of circulation within the system, to reduce rectification losses, to provide a device which is more positive and reliable in operation, and to indirectly heat the generator of the unit. Lifting the absorption solution and circulating the same without appreciable loss of energy is accomplished by catching the turbulent boiling and spurting solution in a heated vessel in suitably designed traps at a height to permit circulation between the absorber and boiler by gravity. The amount of energy used for producing circulation within a refrigerating system of this character is a complete loss in the actual refrigerating process and with this apparatus such loss is reduced to a minimum and rectification losses are smallest when the heat required for liberating the gases is supplied at the lowest temperature possible. According to the present invention the absorption solution is heated in an auxiliary vessel or generator provided with traps for the high boiling solution in the generator proper. The heat supplied at a lower temperature is liberated during condensation of the vapors driven off from the heated vessel and again liquefied. This heat from the auxiliary generator is conducted to the generator proper by means of a metal casting or connecting member of good heat conductivity or a jacket around the generator or similar means.

The invention will first be hereinafter more particularly described with reference to the accompanying drawing which forms a part of this application and later pointed out in the claims at the end of the description.

In the drawing:

The figure is a diagrammatic view illustrating the application of the invention.

The invention is illustrated in connection with an absorption refrigerating apparatus which for the purpose of illustration may be considered as employing ammonia as a refrigerant, water as an absorption medium and hydrogen as a pressure equalizing gas, the invention of course not being restricted to a specific apparatus or to the specific ingredients employed in the system. The apparatus as illustrated in the drawing includes a generator 10, rectifier 11, condenser 12, evaporator 13, heat exchanger 14, absorber 15, auxiliary generator 16 and a heat exchanger 17 for a solution flowing to and from the absorber.

The method of operation of refrigerating units of this character is sufficiently well known so that herein only the new liquid circulation in accordance with the invention will be described.

As the auxiliary generator 16 is connected by the pipe 18 to the generator 10, the circulating system for the absorption solution consists of the absorber 15, the pipe 19 for the strong solution returning from the absorber to the generator, the generator 10, pipe 18, auxiliary generator 16 and pipe 20 having a U-shaped bend 21 for the weak solution returning from the auxiliary generator to the absorber. The absorber is preferably formed of a relatively flat thin construction having relatively long flat plates for exposing a large surface area of entrapped liquid to the gas. On account of the thinness and length of such absorber, relatively few plates are required and there is only a slight vertical height for the trickling liquid to fall. The heat exchanging function between the upper and lower pipes 20 and 19 which carry weak liquor to and strong liquor from the absorber is accomplished by connecting such upper and lower pipes by bars 22 of copper or other metal having a high degree of conductivity.

The auxiliary generator 16 has its upper portion encased with a snugly fitting hood or jacket 23 of copper, aluminum or other material of good heat conducting properties and this hood or jacket is connected by an intermediate body portion 24 of integral formation with a receptacle or jacket 25 in which is closely fitted the generator 10, the members 23 and 25 being formed in accordance with the external configuration of generators about which they fit and these members are also preferably formed in one piece or are connected together in such a manner that heat from one will be readily conducted to the other. The auxiliary generator is also preferably provided in its interior with a plurality of plates or disks for trapping liquid upon the surfaces of the same. Such auxiliary generator may be heated by any desired means, for example by gas burner 28.

By reference to the drawing it will be observed that when the solution in the system is placid or when the device is not in operation, the liquid levels in the absorber 15 and generators 10 and 16 will be the same. Upon heating the auxiliary generator so that liquid is caused to boil, baffle plates 26 having rimmed orifices 27 therein serve as trap basins for the spurting or violently boiling liquid, a certain portion of which liquid is thereby prevented from falling back. The liquid level in this vessel is raised so that liquid enters the pipe 20 and fills the U-bend 21 which forms a liquid seal and prevents gas from flowing from the auxiliary generator through the pipe 20 to the absorber 15. Gases and vapors formed by the boiling of the liquid in the auxiliary vessel consist largely of absorption solution as the liquid entering the auxiliary vessel has been in the absorber substantially freed from gas. Such vapors condense upon coming in contact with the upper portion of the auxiliary generator on account of the cooling effect of the metal hood 23 and heat thus liberated is transmitted through the intermediate portion 24 to the jacket 25, which in turn gives off the heat to the strong solution in the generator 10 as such solution returns from the absorber. If the heat exchange member which consists of the parts 23, 24 and 25 is well insulated, it will transfer very great quantities of heat from the auxiliary generator 16 to the generator 10. This avoids the necessity of heating the generator 10 or any part of it directly by a gas flame or other means and the excessive heating of the absorption solution and therefore the rectification losses are reduced on account of the lower generator temperatures.

The baffle plates 26 in the auxiliary generator may be of any desired construction to suitably serve as trap basins or to prevent or retard the return of the spurting or boiling liquid to the bottom of the chamber. If desired, such plates may be given a conical or spiral formation or placed at an angle. Such plates may be made of wire gauze. In such case they should be preferably placed in inclined position at sufficient height so that the spray caught by the wire gauze will run off the slightly inclined surface into the pipe 20 leading to the absorber.

The pipe 20 may be extended into the auxiliary vessel so that it reaches the normal liquid level in the vessel. However, this is not absolutely necessary, as the high boiling of the liquid in the auxiliary generator 16 very quickly fills the U-tube 21 and seals the gas space of the auxiliary vessel from the gas space of the absorber.

In order to build up liquid columns in the supply line to counterbalance possible pressure variations in either of the generators, a liquid pocket should preferably be provided in the evaporator 13 through which the condensate from the condenser 12 flows.

The auxiliary generator may be vented to the main generator by a pipe connecting the upper portion of the auxiliary generator and extending into the main generator slightly below the surface of the solution therein.

It will be obvious to those skilled in the art that various other changes may be made in the construction and arrangement without departing from the spirit of the invention and therefore the invention is not limited to what is shown in the drawing and described in the specification but only as indicated in the appended claims.

I claim:

1. In a refrigerating unit of the absorption type, an absorber, a generator, an auxiliary generator, a pipe connecting the lower portions of the generators, a pipe connecting the upper portion of the generator with the lower portion of the absorber, a pipe connecting the auxiliary generator with the upper portion of the absorber and means for indirectly heating the generator from the auxiliary generator, said means comprising an intermediate member having a good metallic connection with the upper portion of the auxiliary generator and a similar connection with the lower portion of the generator.

2. In a refrigerating unit of the absorption type, an absorber, a generator, an auxiliary generator, a pipe connecting the lower portions of the generators, a pipe connecting the upper portion of the generator with the lower portion of the absorber, a pipe connecting the auxiliary generator with the upper portion of the absorber and means for indirectly heating the generator from the auxiliary generator, said means comprising an intermediate member having a good metallic connection with the upper portion of the auxiliary generator and a similar connection with the lower portion of the generator, said pipe from the auxiliary generator to the absorber having a U-bend forming a liquid seal.

3. In a refrigerating unit of the absorption type, an absorber, a generator, an auxiliary generator, a pipe connecting the lower portions of the generators, a pipe connecting the upper portion of the generator with the lower portion of the absorber, a pipe connecting the auxiliary generator with the upper portion of the absorber and means for indirectly heating the generator from the auxiliary generator, said means comprising an intermediate member having a good metallic connection with the upper portion of the auxiliary generator and a similar connection with the lower portion of the generator, said pipes between the generator and the absorber and between the auxiliary generator and the absorber being disposed in heat transfer relation.

4. In refrigerating apparatus of the continuous absorption type, a generator, an absorber, means for circulating absorption liquid between the generator and absorber comprising a vessel spaced from said generator and connected to receive absorption liquid therefrom, means for heating said vessel whereby the absorption liquid therein is boiled and thus foamed upwardly to a level from which it flows to the absorber by gravity, and a mass of good heat-conducting material for transferring heat from said vessel to the generator.

5. In refrigerating apparatus of the continuous absorption type, a generator, an absorber, means for circulating absorption liquid between the generator and absorber comprising a vessel horizontally spaced from said generator and connected to receive absorption liquid therefrom, baffle plates in said vessel, and means for heating said vessel whereby absorption liquid is boiled and foamed to a level from which it flows to the absorber by gravity, and a mass of heat-conducting material for transmitting heat from said vessel to the generator.

6. In refrigerating apparatus of the continuous absorption type, a generator, an absorber, means for circulating absorption liquid between the generator and absorber comprising a closed vessel spaced from said generator and connected to receive absorption liquid therefrom, means for heating said vessel whereby absorption liquid is boiled and thus foamed to a level from which it flows to the absorber by gravity, and a path formed by a mass of good heat-conducting material from the vapor space of said vessel to the generator whereby the latter is heated indirectly from said heating means by the transfer of heat of condensation in said vessel through said path.

7. In refrigerating apparatus of the continuous absorption type, a generator, an absorber, means spaced from said generator and operated by heat for effecting circulation of absorption liquid between the generator and absorber, and a mass of good heat-conducting material for transferring heat from said means to expel refrigerant gas from solution in the generator.

8. In absorption type refrigerating apparatus a generator, an absorber, a second generator connected between and spaced from the first said generator and the absorber, heating means for said second generator, a liquid trap between said second generator and said absorber for preventing the flow of vapor therebetween, and means comprising a path of heat-conducting material for transferring heat of condensation from said second generator to said first generator.

9. In absorption type refrigerating apparatus, a generator, an absorber, a second generator spaced from first said generator and connected to receive absorption liquid therefrom, heating means for said second generator, and a path of heat-conducting material for transferring heat of condensation in said second generator to said first generator.

NILS PERSSON.